(12) United States Patent
Ahn et al.

(10) Patent No.: US 12,019,798 B2
(45) Date of Patent: Jun. 25, 2024

(54) DEVICE AND METHOD FOR PROVIDING CUSTOMIZED CONTENT BASED ON GAZE RECOGNITION

(71) Applicant: NHN Corporation, Seongnam-si (KR)

(72) Inventors: Ha Eun Ahn, Gyeonggi-do (KR); Rok Kyu Lee, Gyeonggi-do (KR); Hyug Jae Lee, Gyeonggi-do (KR)

(73) Assignee: NHN CORPORATION, Seongnam-si (KR)

( * ) Notice: Subject to any disclaimer, the term of this patent is extended or adjusted under 35 U.S.C. 154(b) by 0 days.

(21) Appl. No.: 18/097,201

(22) Filed: Jan. 14, 2023

(65) Prior Publication Data

US 2023/0244309 A1 Aug. 3, 2023

(30) Foreign Application Priority Data

Jan. 17, 2022 (KR) .................. 10-2022-0006674

(51) Int. Cl.
*G06F 3/01* (2006.01)
*G06F 3/04842* (2022.01)
(Continued)

(52) U.S. Cl.
CPC .......... *G06F 3/013* (2013.01); *G06F 3/04842* (2013.01); *G06Q 30/0623* (2013.01);
(Continued)

(58) Field of Classification Search
CPC ............ G06F 3/013; G06F 3/04842; G06F 2203/04803; G06F 3/012; G06Q 30/0623;
(Continued)

(56) References Cited

U.S. PATENT DOCUMENTS 7,155,037 B2 12/2006 Nagai et al.
10,235,693 B2 3/2019 Byun et al.
(Continued)

FOREIGN PATENT DOCUMENTS

JP 2001-243466 9/2001
JP 2013-69106 4/2013
(Continued)

OTHER PUBLICATIONS

Office Action dated May 8, 2023 for Korean Patent Application No. 10-2022-0006674 and its English translation provided by Global Dossier.

*Primary Examiner* — Ibrahim A Khan
(74) *Attorney, Agent, or Firm* — Ladas & Parry, LLP

(57) ABSTRACT

A method of providing customized content based on gaze recognition executed by at least one processor of a content providing device includes obtaining a face recognition image of a user based on an image sensor, obtaining a face front view image of the user by controlling the image sensor based on the obtained face recognition image, generating gaze information including a gaze direction and gaze fixing time information of the user based on the obtained face front view image, determining a display area corresponding to the generated gaze information as a region of interest, detecting an item matching the determined region of interest, and providing product information content for the detected item.

17 Claims, 8 Drawing Sheets

(51) Int. Cl.
  *G06Q 30/0601*  (2023.01)
  *G06V 10/82*  (2022.01)
  *G06V 40/16*  (2022.01)
(52) U.S. Cl.
  CPC ............ *G06V 10/82* (2022.01); *G06V 40/166*
       (2022.01); *G06F 2203/04803* (2013.01)
(58) Field of Classification Search
  CPC ............... G06Q 30/0643; G06Q 50/10; G06Q
         30/0271; G06V 10/82; G06V 40/166;
         G06V 40/161; G06V 40/18; G06V 40/16;
         G06N 3/0464; G06N 3/02
  See application file for complete search history.

(56) References Cited

U.S. PATENT DOCUMENTS

| | | | | |
|---|---|---|---|---|
| 10,339,758 | B2* | 7/2019 | Froy | G07F 17/3209 |
| 10,732,721 | B1* | 8/2020 | Clements | B66B 1/468 |
| 10,802,582 | B1* | 10/2020 | Clements | G06F 3/013 |
| 11,176,398 | B2 | 11/2021 | Lee et al. | |
| 11,231,587 | B2 | 1/2022 | Nakata et al. | |
| 2001/0019620 | A1 | 9/2001 | Nagai et al. | |
| 2014/0089097 | A1 | 3/2014 | Byun et al. | |
| 2016/0148080 | A1* | 5/2016 | Yoo | G06V 40/171 |
| | | | | 382/118 |
| 2016/0188962 | A1* | 6/2016 | Taguchi | G06V 40/193 |
| | | | | 382/117 |
| 2017/0123491 | A1* | 5/2017 | Hansen | G06F 3/012 |
| 2017/0123500 | A1* | 5/2017 | Needham | G06F 3/017 |
| 2018/0232799 | A1* | 8/2018 | Kitagawa | G06Q 30/0623 |
| 2019/0213399 | A1* | 7/2019 | Yoo | G10L 17/02 |
| 2020/0074961 | A1* | 3/2020 | Yu | G09G 5/377 |
| 2020/0183496 | A1* | 6/2020 | Sugihara | G06F 3/012 |
| 2020/0184230 | A1* | 6/2020 | Liu | G06T 7/70 |
| 2020/0201048 | A1 | 6/2020 | Nakata et al. | |
| 2020/0250736 | A1* | 8/2020 | Howard | G06V 20/10 |
| 2021/0034904 | A1* | 2/2021 | Lee | H04N 23/698 |
| 2021/0181892 | A1* | 6/2021 | Rudick | G06F 3/04842 |
| 2021/0304256 | A1* | 9/2021 | Ishida | G06T 1/00 |
| 2021/0335085 | A1* | 10/2021 | Froy, Jr. | A63F 13/428 |
| 2022/0172276 | A1 | 6/2022 | Suk et al. | |
| 2022/0237660 | A1* | 7/2022 | Balondona | G06Q 30/0276 |
| 2023/0070498 | A1 | 3/2023 | Suk | |

FOREIGN PATENT DOCUMENTS

| | | |
|---|---|---|
| JP | 2014-67401 | 4/2014 |
| JP | 2019-39988 | 3/2019 |
| JP | 2020-201868 | 12/2020 |
| JP | 2021-145198 | 9/2021 |
| KR | 2002-0079236 | 10/2002 |
| KR | 10-2014-0052263 | 5/2014 |
| KR | 10-2015-0108575 | 9/2015 |
| KR | 10-2016-0031183 | 3/2016 |
| KR | 10-2017-0085297 | 7/2017 |
| KR | 10-2019-0096189 | 8/2019 |
| KR | 10-2020-0043786 | 4/2020 |
| KR | 10-2020-0142827 | 12/2020 |
| KR | 10-2021-0000078 | 1/2021 |
| KR | 10-2198360 | 1/2021 |
| KR | 10-2021-0048075 | 5/2021 |
| KR | 10-2305880 | 9/2021 |

* cited by examiner

DEVICE AND METHOD FOR PROVIDING CUSTOMIZED CONTENT BASED ON GAZE RECOGNITION

CROSS REFERENCE TO RELATED APPLICATION

This application claims priority from and benefit of Korean Patent Application No. 10-2022-0006674, filed on Jan. 17, 2022, which is hereby incorporated by reference for all purposes as if fully set forth herein.

BACKGROUND OF INVENTION

Field of the Invention

The present disclosure relates to a device and method for providing customized content based on gaze recognition. More specifically, the present disclosure relates to a device and method for providing customized content by estimating a degree of interest of a device user in real time based on recognition of a gaze of the device user gazing at a product.

Related Art

Among various advertising methods in the information age, advertising methods using display devices provide advertisements to a number of people unilaterally regardless of degrees of interest of viewers.

The effects of advertisements vary widely depending on viewers' interests in advertising products or personal tastes, and in order to increase the effects of advertisements, viewers' tastes and consumption patterns are collected to provide personalized advertisements.

However, a method of estimating degrees of interest based on such information and providing customized advertisements has a problem in that it is impossible to reflect degrees of interest of viewers when they actually consume media.

In addition, in the case where an advertisement can be exposed on a predetermined device, there is a method of providing an advertisement for a product of interest through selection of a user who uses the device, but this requires a user's action and thus the advertisement is less exposed as compared to a method of unilaterally or automatically providing advertisements.

Accordingly, there is a need for a method of automatically displaying an advertisement by immediately reflecting a degree of interest of a user when the user consumes media.

(Patent document 1) KR 20020079236 A1

SUMMARY

The present disclosure has been devised to solve the problems of the prior art as described above, and an object of the present disclosure is to provide a device and method for providing customized content based on gaze recognition.

Furthermore, the present disclosure provides a device and method for providing customized content based on gaze recognition which automatically adjust a viewing angle of a camera attached to the device in real time according to physical characteristics of a user.

Furthermore, the present disclosure provides a device and method for providing customized content based on gaze recognition which output content for a product that a user is gazing at.

Furthermore, the present disclosure provides a device and method for providing customized content based on gaze recognition which divide a content output screen in accordance with the number of a plurality of users.

However, the technical tasks to be achieved by the present disclosure and embodiments of the present disclosure are not limited to the technical tasks described above, and other technical tasks may be present.

A method of providing customized content based on gaze recognition executed by at least one processor of a content providing device according to an embodiment of the present disclosure includes obtaining a face recognition image of a user based on an image sensor, obtaining a face front view image of the user by controlling the image sensor based on the obtained face recognition image, generating gaze information including a gaze direction and gaze fixing time information of the user based on the obtained face front view image, determining a display area corresponding to the generated gaze information as a region of interest, detecting an item matching the determined region of interest, and providing product information content for the detected item.

The obtaining of a face front view image of the user by controlling the image sensor based on the obtained face recognition image may include providing the face recognition image as input data of a pre-trained deep learning neural network, obtaining face pose information of the user as output data of the deep learning neural network, and controlling the image sensor based on the obtained face pose information.

Furthermore, the determining of a display area corresponding to the generated gaze information as a region of interest may include determining a display area corresponding to the gaze direction of the user as the region of interest when the gaze fixing time information of the user satisfies a preset time or longer.

Furthermore, the detecting of an item matching the determined region of interest may include obtaining a user input for selecting an item page output based on the display area and detecting an item matching the region of interest in the selected item page.

Furthermore, the determining of a display area corresponding to the gaze information as a region of interest may include updating the region of interest to a display area corresponding to changed gaze information when the gaze information is changed.

Furthermore, the detecting of an item matching the determined region of interest may include detecting at least one pixel in a display area matching the region of interest and detecting a pre-stored item for the at least one detected pixel.

Furthermore, the method of providing customized content based on gaze recognition according to an embodiment of the present disclosure may further include obtaining a user input for selecting at least one pixel within the display area, detecting a pre-stored item for the selected at least one pixel, and outputting product information content for the detected item.

A device for providing customized content based on gaze recognition according to an embodiment of the present disclosure includes at least one image sensor configured to obtain a face recognition image of a user, at least one display configured to display product information content based on the obtained face recognition image, and at least one processor, wherein the processor obtains a face front view image of the user by controlling the image sensor based on the face recognition image, generates gaze information including a gaze direction and gaze fixing time information of the user based on the obtained face front view image, determines a display area corresponding to the generated gaze information as a region of interest, detects an item matching the determined region of interest, and provides product information content for the detected item.

Furthermore, the display may include an item display for displaying a representative image of at least one item, and a content display for displaying the product information content.

Furthermore, the processor may obtain face pose information of the user based on deep learning based on the face recognition image and obtain the face front view image of the user by controlling the image sensor based on the obtained face pose information.

Advantageous Effects

According to the device and method for providing customized content based on gaze recognition according to an embodiment of the present disclosure, a time required to perform initial settings suited to a user whenever users change is reduced by automatically adjusting the viewing angle of a camera attached to the device in real time according to physical characteristics of a user.

Furthermore, according to the device and method for providing customized content based on gaze recognition according to an embodiment of the present disclosure, a product of interest of a user is intuitively ascertained by outputting content with respect to a product that the user is gazing at, thereby improving user satisfaction according to exposure of content.

In addition, according to the device and method for providing customized content based on gaze recognition according to an embodiment of the present disclosure, a content output screen is efficiently used by dividing the content output screen in accordance with the number of users, thereby increasing deliver of advertisements and information to each user.

However, the effects that can be obtained in the present disclosure are not limited to the above-mentioned effects, and other effects that are not mentioned can be clearly understood from the description below.

DESCRIPTION OF EXEMPLARY EMBODIMENTS

A device for providing customized content based on gaze recognition according to an embodiment of the present disclosure may recognize a user's gaze by automatically adjusting the angle of a camera attached to the device in real time based on a captured image of the user and provide customized content based on gaze recognition, which is content including product information on an item that the user is gazing at.

In the embodiment, items refer to goods and services that can be sold to users using the device for providing customized contents based on gaze recognition.

Furthermore, in the embodiment, product information refers to advertisements and additional information about items that can be sold to users using the device.

Device 100 for Providing Customized Contents Based on Gaze Recognition

Figure 1:
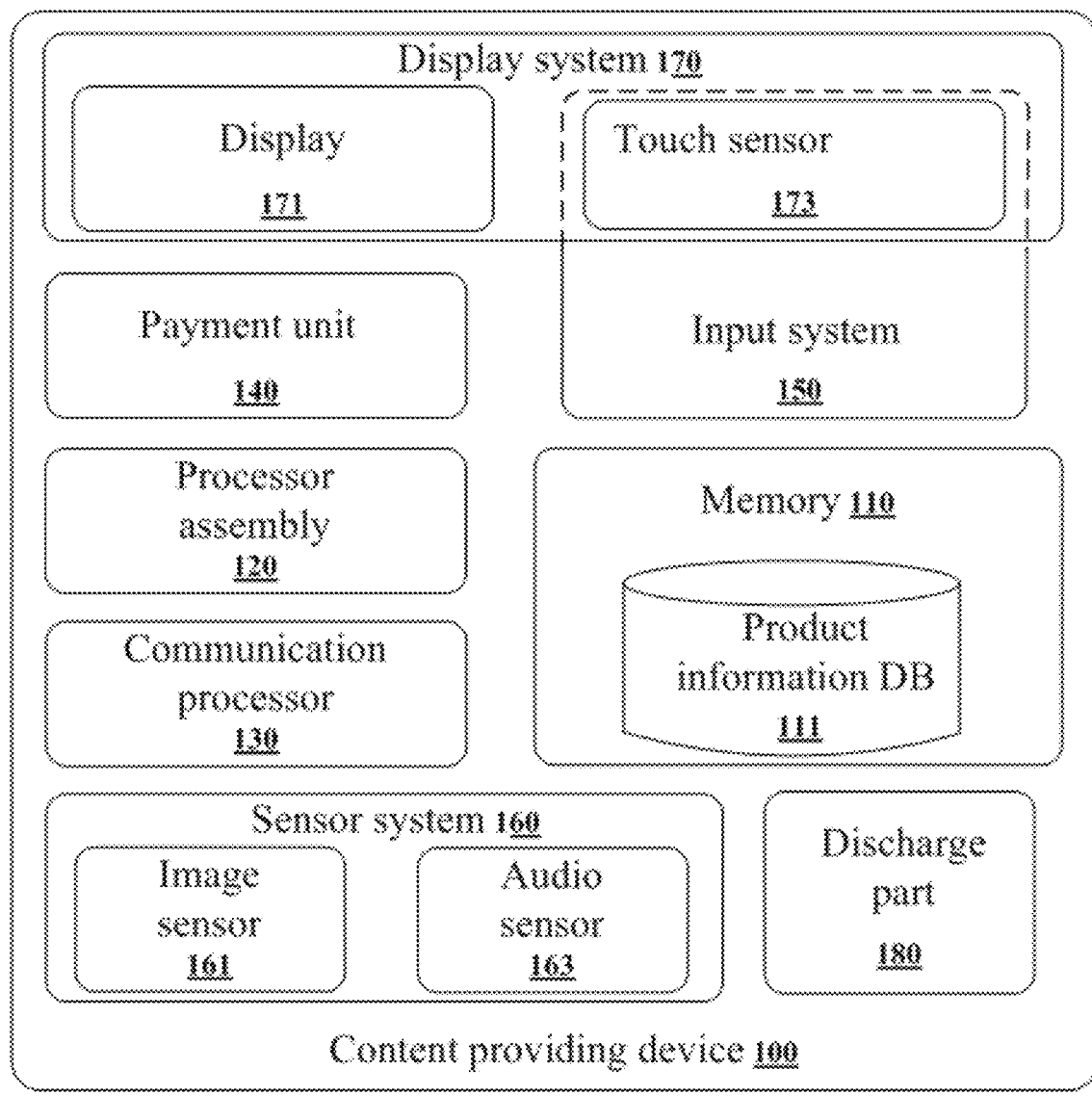
FIG. 1 is an internal block diagram of a device for providing customized content based on gaze recognition according to an embodiment of the present disclosure.

FIG. 1 is an internal block diagram of a device for providing customized content based on gaze recognition (hereinafter referred to as a content providing device 100) according to an embodiment of the present disclosure.

Referring to FIG. 1, the content providing device 100 according to an embodiment of the present disclosure may be a predetermined computing device in which a processor assembly 120 providing customized content based on gaze recognition is installed.

The content providing device 100 in the embodiment may provide a purchasing environment in which a user can purchase a predetermined item selected by the user.

Further, according to an embodiment, the content providing device 100 may provide a content output environment in which content including an advertisement and additional information regarding an item that a user gazes at is output to a display included in the device.

In addition, the content providing device 100 in the embodiment may obtain a captured image of the front face of a user.

The content providing device 100 may be implemented as a vending machine or a kiosk that is easy to use in an environment in which consumers generally purchase items in the most preferable embodiment. Although the content providing device 100 will be described based on the vending machine type in the following description, the present disclosure is not limited thereto.

For example, the content providing apparatus 100 may be various display devices that display a content output environment for purchasing a product while tracking a gaze through a camera. For example, the content providing device 100 may include a smart phone, a mobile phone, a digital broadcasting device, a personal digital assistant (PDA), a portable multimedia player (PMP), a tablet PC, a fixed desktop PC, and a laptop computer. A personal computer such as a laptop computer and an ultrabook may be included.

In the embodiment, the processor assembly 120 is installed in the above-described content providing device 100 and may perform various functional operations performed by the content providing device 100.

Further, the content providing device 100 in the embodiment may further include a predetermined server computing device to provide a content output environment.

Referring to FIG. 1, the content providing device 100 may include a memory 110, the processor assembly 120, a communication processor 130, a payment unit 140, an input system 150, a sensor system 160, a display system 170, and a discharge unit 180 from a functional point of view. These components may be configured to be included in the housing of the content providing device 100.

Specifically, a product information database 111 may be stored in the memory 110, and any one or more of various application programs, data, and commands for providing a content output environment may be stored in the product information database 111.

Here, the product information database 111 in the embodiment refers to a data set in which product information on each item sold through the content providing device 100 is stored in advance.

That is, the memory 110 may store commands and data that may be used to create a content output environment.

Further, the memory 110 may include a program region and a data region.

Here, the program region according to an embodiment may be linked between an operating system (OS) and functional elements for booting the content providing device 100, and the data region may store data generated when the content providing device 100 is used.

In addition, the memory 110 may include at least one non-transitory computer-readable storage media and temporary computer-readable storage medium.

For example, the memory 110 may be various storage devices such as a ROM, an EPROM, a flash drive, and a hard drive and may include a web storage that executes the storage function of the memory 110 on the Internet.

The processor assembly 120 may include at least one processor capable of executing instructions of the product information database 111 stored in the memory 110 in order to perform various operations for providing a purchasing environment and a content output environment.

In the embodiment, the processor assembly 120 may control overall operations of the components through the product information database 111 of the memory 110 to provide customized content.

The processor assembly 120 may be a system on chip (SOC) suitable for the content providing device 100 including a central processing unit (CPU) and/or a graphic processing unit (GPU) and may execute the operating system (OS) and/or application programs stored in the memory 110 and control the components mounted in the content providing device 100.

In addition, the processor assembly 120 may internally communicate with each component through a system bus and may include one or more predetermined bus structures including a local bus.

In addition, the processor assembly 120 may include at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and electrical units for performing other functions.

The communication processor 130 may include one or more devices for communicating with external devices. This communication processor 130 may perform communication through a wireless network.

Specifically, the communication processor 130 may communicate with a predetermined computing device storing a content source for implementing a content output environment, and may communicate with various user input components such as a controller that receives a user input.

In the embodiment, the communication processor 130 may transmit/receive various types of data related to customized content to/from another content providing device 100 and/or an external server.

Specifically, the communication processor 130 in the embodiment may receive content with respect to an item selected by a user by communicating with other external devices and external servers using Over The Top (OTT).

The communication processor 130 may transmit/receive data to/from at least one of a base station, an external content providing device 100, and an arbitrary server on a mobile communication network constructed through a communication apparatus based on technical standards or communication schemes for mobile communication (e.g., Long Term Evolution (LTE), Long Term Evolution-Advanced (LTE-A), 5G New Radio (NR), and Wi-Fi) or short-range communication schemes.

The sensor system 160 may include various sensors such as an image sensor 161 and an audio sensor 165.

Here, the image sensor 161 may capture an image and/or video of a physical space around the content providing device 100.

The image sensor 161 in the embodiment may capture and obtain an image related to customized content (e.g., a face recognition image of a user, a face front view image, etc.).

In addition, the image sensor 161 may be disposed on the front side and/or the rear side of the content providing device 100 to obtain an image by photographing the side in the direction in which it is disposed and may photograph a physical space through a camera disposed toward the outside of the content providing device 100.

In the embodiment, the camera may be implemented such that the angle thereof can be adjusted by recognizing the position of the face of a user.

In addition, the camera may further include a motor for adjusting the angle in the embodiment.

The image sensor 161 may include an image sensor device and an image processing module. Specifically, the image sensor 161 may process still images or moving images obtained by the image sensor device (e.g., CMOS or CCD).

In addition, the image sensor 161 may extract necessary information by processing a still image or a moving image obtained through the image sensor device using the image processing module and transmit the extracted information to a processor.

The image sensor 161 may be a camera assembly including one or more cameras. The camera assembly may include a general camera that captures a visible light band, and may further include special cameras such as an infrared camera and a stereo camera.

In addition, the image sensor 161 as described above may be included in the content providing device 100 according to an embodiment, or may be included in an external device (e.g., an external server or the like) and operate through linkage based on the communication processor 130 described above.

The audio sensor 165 may recognize sounds around the content providing device 100.

Specifically, the audio sensor 165 may include a microphone capable of detecting voice input of a user using the content providing device 100 and/or audio signals from the surrounding environment of the content providing device 100.

The payment unit 140 may perform overall operations related to payment for costs of purchasing and using a predetermined item selected by a user through the content providing device 100.

The payment unit 140 is provided in any vending machine. In the embodiment, the payment unit 140 may include a cash slot, a card slot, a card reader, and an input amount recognition part, but any component for performing operations related to payment may be added to the payment unit 140.

The input system 150 may detect user input related to customized content (e.g., gestures, voice commands, operations of buttons, or other types of input).

Specifically, the input system 150 may include predetermined buttons, a touch sensor, and/or an image sensor 161 for receiving user motion input.

The input system 150 is provided in any vending machine, and in the embodiment, the input system 150 may include buttons, a touch sensor, and a touch screen. However, any component capable of performing input for an item selected by a user may be added to the input system 150.

The display system 170 may output various types of information related to customized content as graphic images.

In the embodiment, the display system 170 may display a face recognition image of a user, a face front view image, photographing position feedback information, a feedback message, item content, and the like using a display.

Such a display may include at least one of a liquid crystal display (LCD), a thin film transistor-liquid crystal display (TFT-LCD), an organic light-emitting diode (OLED), a flexible display, a 3D display, and an e-ink display.

The aforementioned components may be disposed in the housing of the content providing device 100, and a user interface may include a touch sensor 173 on a display 171 configured to receive a user touch input.

Specifically, the display system 170 may include the display 171 that outputs an image and the touch sensor 173 that detects a user touch input.

For example, the display 171 may be implemented as a touch screen by forming a layered structure with the touch sensor 173 or integrating with the touch sensor 173. Such a touch screen may serve as a user input unit providing an input interface between the content providing device 100 and a user and may provide an output interface between the content providing device 100 and the user.

The discharge part 180 may discharge a predetermined item that may be provided to a user using the content providing device 100 to the outside of the device.

The discharge part 180 is provided in any vending machine, and in the embodiment, the discharge part 180 may discharge an item purchased by a user, change, a receipt, and the like to the outside of the device and may be implemented as any component performing operations related to discharging.

Meanwhile, the content providing device 100 according to an embodiment of the present disclosure may perform deep learning necessary for providing customized content in association with a deep-learning neural network.

Here, the deep learning neural network according to the embodiment may include a convolution neural network (CNN), Regions with CNN features (R-CNN), Fast R-CNN, Faster R-CNN, and/or Mask R-CNN, and may include any deep learning neural network including an algorithm capable of performing an embodiment which will be described later. In an embodiment of the present disclosure, such a deep learning neural network is not limited or restricted.

Specifically, the content providing device 100 in the embodiment may perform deep learning required for providing customized content using the pose estimation model and the gaze estimation model based on the above-described deep learning neural network.

The pose estimation model is a model designed using the papers "Whole-Body Human Pose Estimation in the Wild" and "RMPE: Regional Multi-Person Pose Estimation."

In addition, the gaze estimation model is a model designed using the papers "Learning to Find Eye Region Landmarks for Remote Gaze Estimation in Unconstrained Settings" and "Gaze360: Physically Unconstrained Gaze Estimation in the Wild."

The content providing device 100 according to the embodiment may automatically adjust an initial camera position of a user in real time using such deep learning technology.

In addition, the content providing device 100 according to the embodiment may determine a user that is a gaze tracking target in real time and automatically track a gaze of the user using such deep learning technology.

Figure 2:
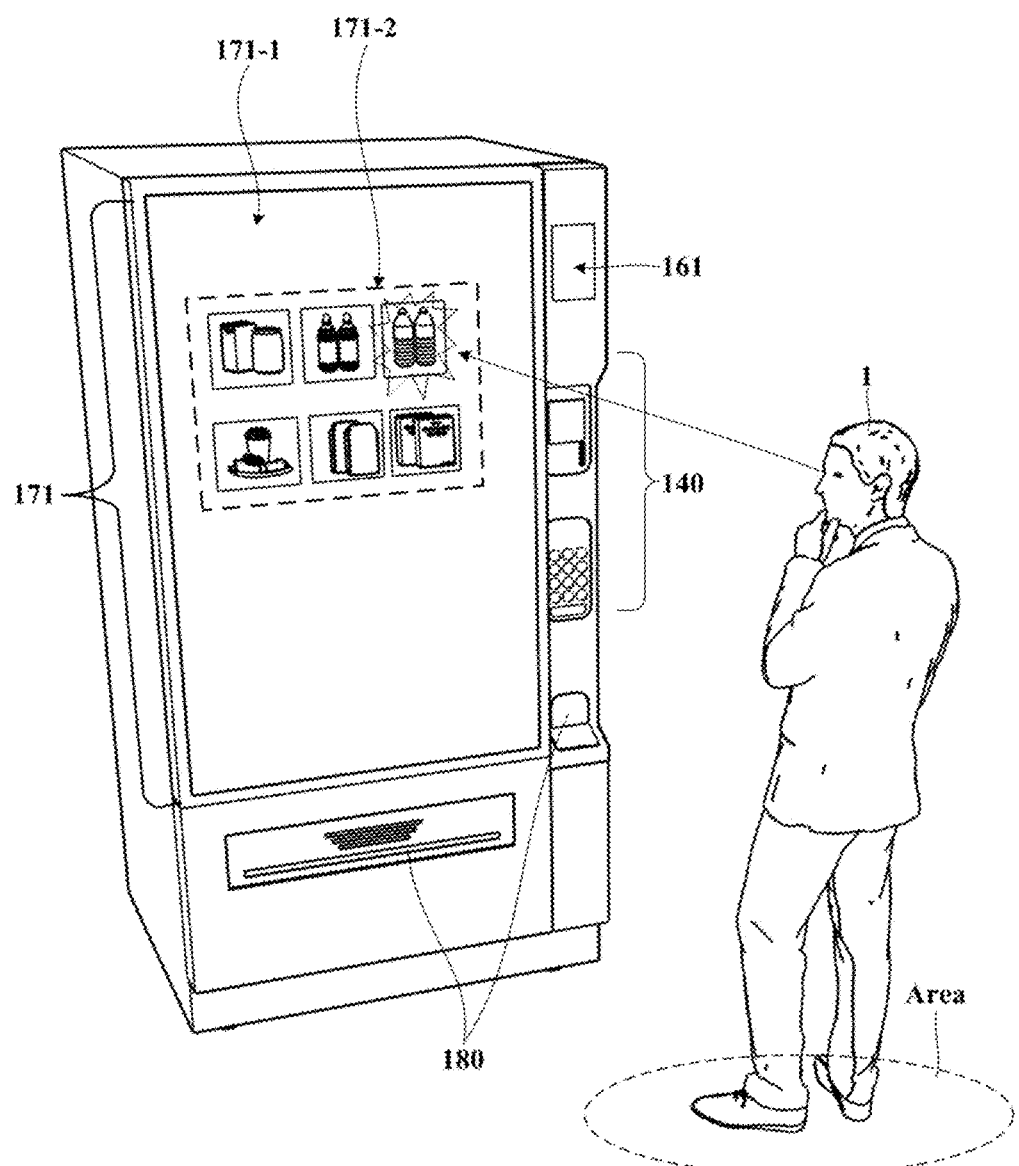
FIG. 2 is an exemplary diagram illustrating the device for providing customized content based on gaze recognition according to an embodiment of the present disclosure.

FIG. 2 is an exemplary diagram illustrating the device 100 for providing customized content based on gaze recognition according to an embodiment of the present disclosure.

Referring to FIG. 2, the content providing device 100 may include the payment unit 140, the image sensor 161, the display 171, and the discharge part 180 on one side.

The image sensor 161 may be provided on the same side as the side on which items to be sold to a user 1 and item images are displayed in order to recognize a gaze of the user 1.

The display 171 may include a content display 171-1 and an item display 171-2.

In the embodiment, the content display 171-1 refers to a display on which content including product information on an item upon which the user 1 gazes is displayed.

In the embodiment, the item display 171-2 refers to a display on which an image representing an item to be sold to the user 1 is displayed. In this case, predetermined buttons may be positioned in the area of the item display 171-2, or the touch sensor 173 may be embedded in part or all of the area.

Accordingly, the content providing device 100 may provide a user interface capable of receiving input of the user 1 based on the item display 171-2.

In addition, the payment unit 140 and the discharge part 180 may be located in any parts of the content providing device 100 as long as they are easily used by the user 1 and are not limited to the parts shown in the figure.

Method of Providing Customized Content Based on Gaze Recognition by Content Providing Device 100

Hereinafter, a method of providing customized content based on gaze recognition by the content providing device 100 executed by the processor assembly 120 including at least one processor according to an embodiment of the present disclosure will be described in detail with reference to FIG. 3 to FIG. 7.

Figure 3:
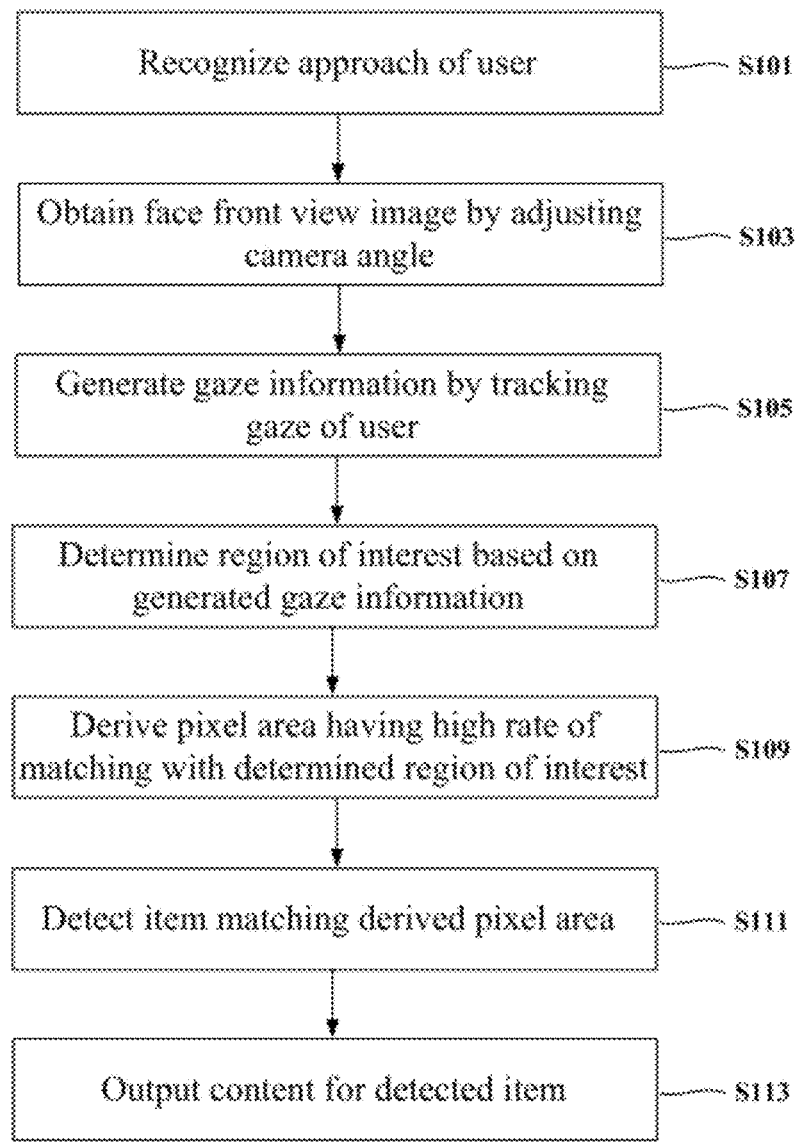
FIG. 3 is a flowchart illustrating a method of providing customized content based on gaze recognition according to an embodiment of the present disclosure.

FIG. 3 is a flowchart illustrating a method of providing customized content based on gaze recognition according to an embodiment of the present disclosure.

Referring to FIG. 3, the content providing device 100 may recognize approach of the user 1 (S101).

Specifically, the content providing device 100 in the embodiment may recognize approach of the user 1 using the image sensor 161 attached to the device 100.

The content providing device 100 in the embodiment may change the state of the user 1 to match preset normal approach reference information.

Here, the normal approach reference information according to the embodiment may include initial position information and initial appearance information required for the user 1 who wants to use the content providing device 100.

Here, the initial position information may be information for guiding an arrangement state of the user 1 (e.g., position, angle, etc.). Further, the initial appearance information may be information for guiding an appearance state of the user 1 (e.g., appearance for recognizing the eyes and face).

Specifically, the content providing device 100 may store predetermined initial position information and initial appearance information according to settings of a device manager and a preset process.

In the embodiment, the initial position information may be preset to guide a predetermined position at which the face of the user 1 can be photographed. In addition, the initial appearance information may be preset to guide a predetermined appearance state required to be maintained while the user 1 is using the content providing device 100 (e.g., a state in which the user 1 does not wear a hat or sunglasses).

In addition, the content providing device 100 in the embodiment may generate approach feedback information based on the normal approach reference information preset as above and output the approach feedback information through the display 171 to provide the same to the user 1.

Here, the approach feedback information may refer to information for guiding adjustment/change of the state of the user 1 (position, angle, appearance, etc. in the embodiment) such that a face recognition image is obtained at a position at which photographing environment conditions are satisfied at the time of photographing the appearance of the user 1.

The photographing environment conditions are conditions for easily estimating the face area of the user 1 using the content providing device 100, and in the embodiment, may be conditions for easy acquisition of facial key points and gaze information of the user 1, which will be described in detail later.

For example, referring back to FIG. 2, the content providing device 100 may adjust the position, angle, and appearance of the user 1 by outputting approach feedback information such as "Locate in the Area," "Look at the image sensor 161" and "Take off your hat" related to the photographing environment conditions as text through the display 171.

In this manner, the content providing device 100 in the embodiment may capture and obtain a face recognition image 10 of the user 1 using the image sensor 161.

In the embodiment, the face recognition image 10 means an image obtained by recognizing the user's face when the user has approached the content providing device 100 by a predetermined distance in order to determine the user's face area.

Next, the content providing device 100 in the embodiment may obtain a face front view image by adjusting a camera angle (S103).

Specifically, the content providing device 100 in the embodiment may determine the user's face area through a deep learning model based on the face recognition image 10 and adjust the position and angle of the camera using a motor included in the camera according to the determined face area to obtain the face front view image.

Here, the content providing device 100 may detect facial key points of the user 1 using the pose estimation model among deep learning models.

Figure 4:
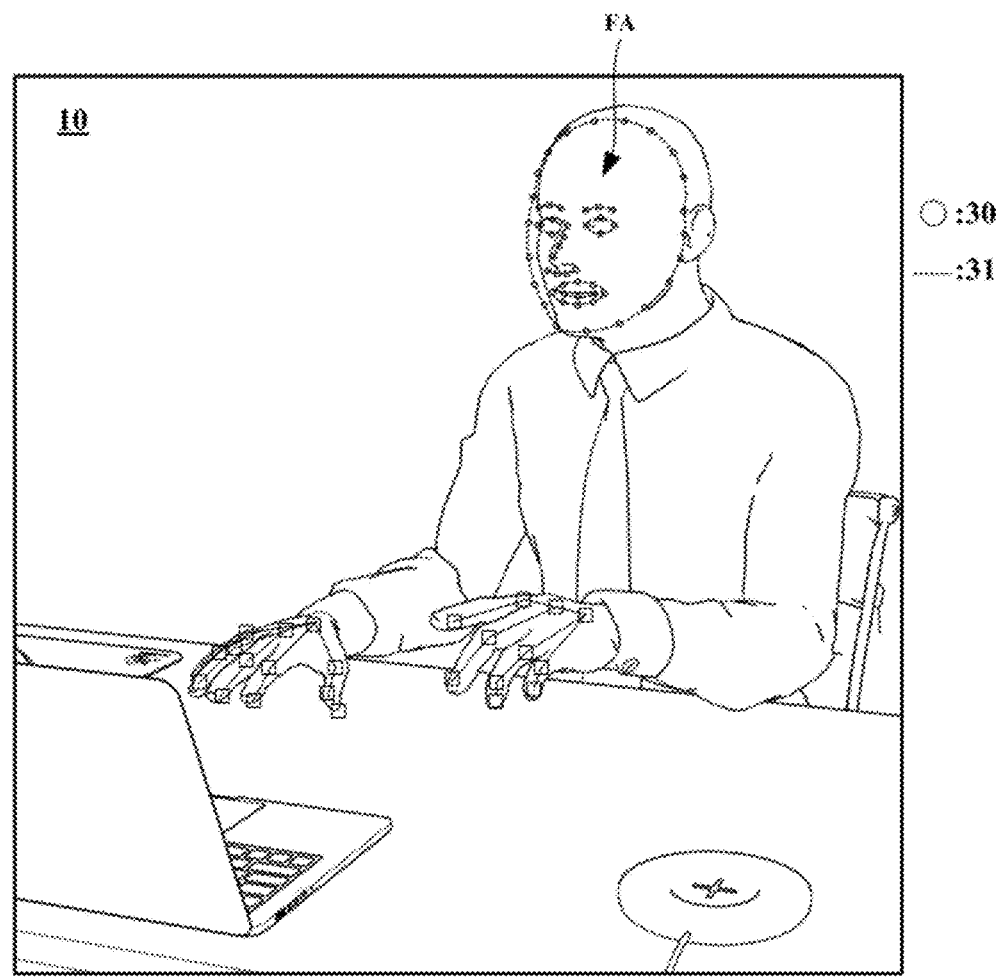
FIG. 4 is an exemplary diagram illustrating a method of estimating facial key points according to an embodiment of the present disclosure.

FIG. 4 is an exemplary diagram illustrating a method of estimating facial key points 30 according to an embodiment of the present disclosure.

Referring to FIG. 4, the content providing device 100 may detect the facial key points 30 in the face recognition image 10 by performing deep learning analysis based on the obtained face recognition image 10 of the user 1.

Here, the facial key points 30 according to the embodiment may include at least one key point and sub key point 31 capable of specifying the face shape of the user 1.

In the embodiment, the facial key points 30 may include eye key points for specifying the shape of the eyes of the user, nose key points for specifying the shape of the nose, mouth key points for specifying the shape of the mouth, and/or ear key points for specifying the shape of the ears, and the key points described above may be connected by the sub key points 31.

That is, the content providing device 100 in the embodiment may perform detection deep learning to extract key points of the face of the user 1 from the face recognition image 10 in association with a predetermined deep learning neural network.

In addition, the content providing device 100 may obtain face pose information including the direction and angle of the face of the user 1 based on a plurality of extracted facial key points of the user 1 as output data of the deep learning neural network.

That is, the photographing environment conditions described above in step S101 may include a condition that all of the facial key points 30 that specify the face shape of the user 1 are included, and a condition that a pixel area based on the facial key points 30 satisfies predetermined criteria (e.g., a preset pixel area or more and a preset ratio to the entire pixel area of the face recognition image 10 or more).

In addition, the content providing device 100 in the embodiment may obtain face pose information, which is information including the direction and angle of the face of the user 1, based on the detected facial key points of the user 1.

In addition, the content providing device 100 in the embodiment may control the image sensor based on the obtained face pose information of the user 1.

In order to perform image sensor control, the content providing device 100 may set standard front face area information based on predetermined facial key points.

As an embodiment, the content providing device 100 may preset the standard front face area information including a degree of clustering of predetermined facial key points (a predetermined reference interval (e.g., an interval of 0.1 cm, an error range of ±5%, etc.), a predetermined reference area (e.g., 3 cm$^2$, an error range of ±5%, etc.), and the like), the number of predetermined facial key points, and/or presence/absence of predetermined facial key points.

That is, the content providing device 100 may compare the obtained face pose information of the user 1 with the preset standard front face area information and obtain the face pose information according to an error value.

In addition, the content providing device 100 may obtain a face front view image including a front face of the user 1 by controlling the image sensor described above based on the obtained face pose information.

In addition, if there is a plurality of recognized face areas FA of users 1 in the face recognition image 10, the content providing device 100 may exclude face areas FA having a predetermined size (e.g., 3 cm$^2$) or less from the plurality of recognized face areas FA according to the photographing environment conditions in the embodiment.

For example, when there are two or more users who want to use the content providing device 100 and a face area of a user other than the current user who currently uses the device is recognized, only the face area FA of the current user can be recognized by excluding the face area of the other user from determination targets.

In addition, the content providing device 100 may automatically determine the face area FA of the user 1 in real time and thus can automatically change the angle of the camera in real time.

That is, the content providing device 100 may change the viewing angle of the camera using the motor included in the camera in order to normally recognize the determined face area FA of the user 1, thereby automatically adjusting the angle of the camera to fit the user 1 in real time.

Further, the content providing device 100 in the embodiment may obtain a face front view image of the user 1 by adjusting the angle of the camera.

Here, the face front view image 20 is for obtaining gaze information 40 of the user 1 and may refer to an image including a front face of the user 1 obtained by adjusting the angle of the camera such that the user's eyes, nose, and mouth appear well based on the face recognition image 10.

Next, the content providing device 100 in the embodiment may generate the gaze information 40 by tracking the gaze of the user 1 (S105).

Specifically, the content providing device 100 in the embodiment may generate the gaze information 40 by tracking the gaze of the user 1 based on eye key points 30-E included in the face area FA of the user 1.

Here, the gaze information 40 is information obtained by estimating a gaze position, a gaze direction, and a gaze fixing time (e.g., seconds) of the user 1 and may include various types of information related to the gaze of the user 1.

That is, the content providing device 100 in the embodiment may generate the gaze information 40 of the user 1 by tracking the gaze direction of the user 1 based on the face front view image 20 of the user 1.

Figure 5:
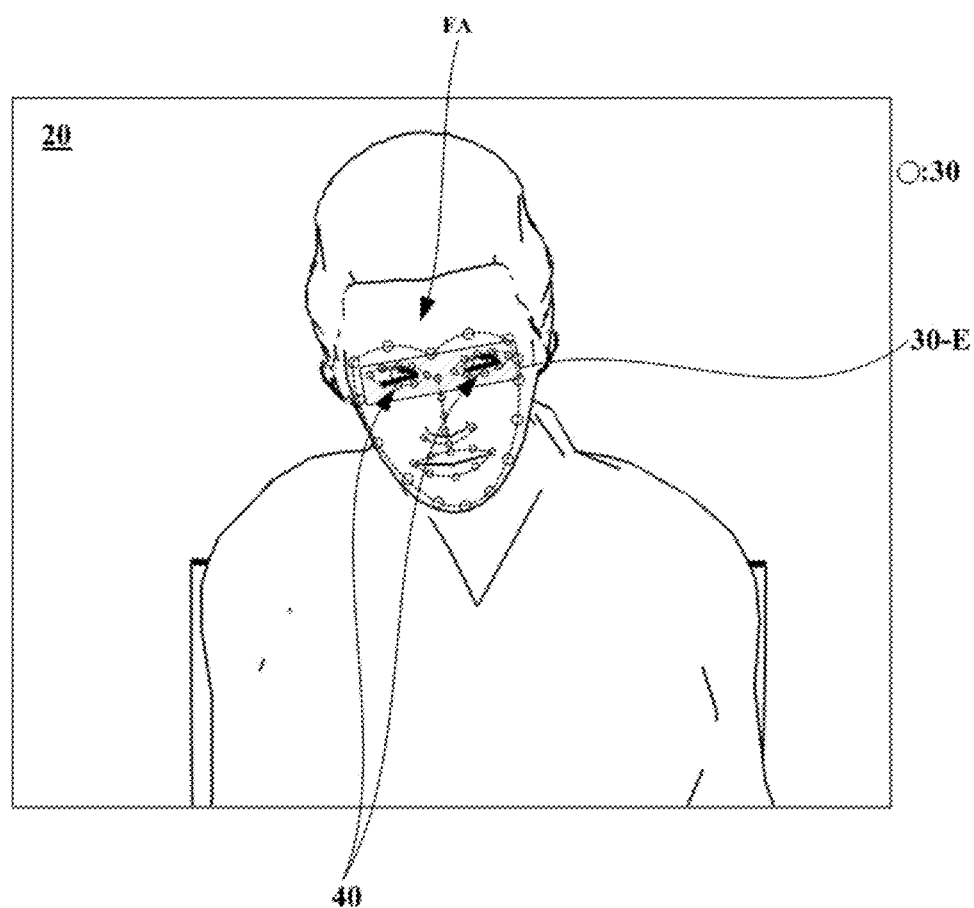
FIG. 5 is an exemplary diagram illustrating gaze information for tracking a gaze direction according to an embodiment of the present disclosure.

FIG. 5 is an exemplary diagram illustrating the gaze information 40 for tracking a gaze direction according to an embodiment of the present disclosure.

Referring to FIG. 5, the content providing device 100 in the embodiment may track the gaze direction of the user 1 based on the eye key points 30-E included in the face front view image 20.

Specifically, the content providing device 100 in the embodiment may track the gaze direction of the user 1 based on the eye key points 30-E that provide gaze information of the user 1 from among the plurality of face key points 30 included in the face front view image 20.

Here, the face front view image 20 may include a state of the user 1 while making a purchase decision using the content providing device 100, and the eye key points 30-E may be detected by estimating the positions of the eyes in the face area FA through a predetermined deep learning process (using the pose estimation model in the embodiment) in step S103.

In addition, the content providing device 100 in the embodiment may generate the gaze information 40 obtained by continuously tracking the gaze of the user 1 through the detected eye key points 30-E.

Here, the content providing device 100 in the embodiment may generate the gaze information 40 by estimating the position and direction of the gaze of the user 1 through a predetermined deep learning process (using the gaze estimation model in the embodiment).

In this case, if the gaze fixing time of the user 1 included in the generated gaze information 40 is equal to or longer than a predetermined time (e.g., 0.5 second or longer), the content providing device 100 in the embodiment may set the gaze fixing time as a time of interest.

Here, if a plurality of gaze fixing times is set as times of interest, the content providing device 100 may regard and set only the longest time thereamong as a time of interest in the embodiment.

Further, the content providing device 100 in the embodiment may determine a region of interest based on the generated gaze information 40 (S107).

Specifically, the content providing device 100 in the embodiment may determine the region of interest based on the time of interest included in the generated gaze information 40.

Figure 6:
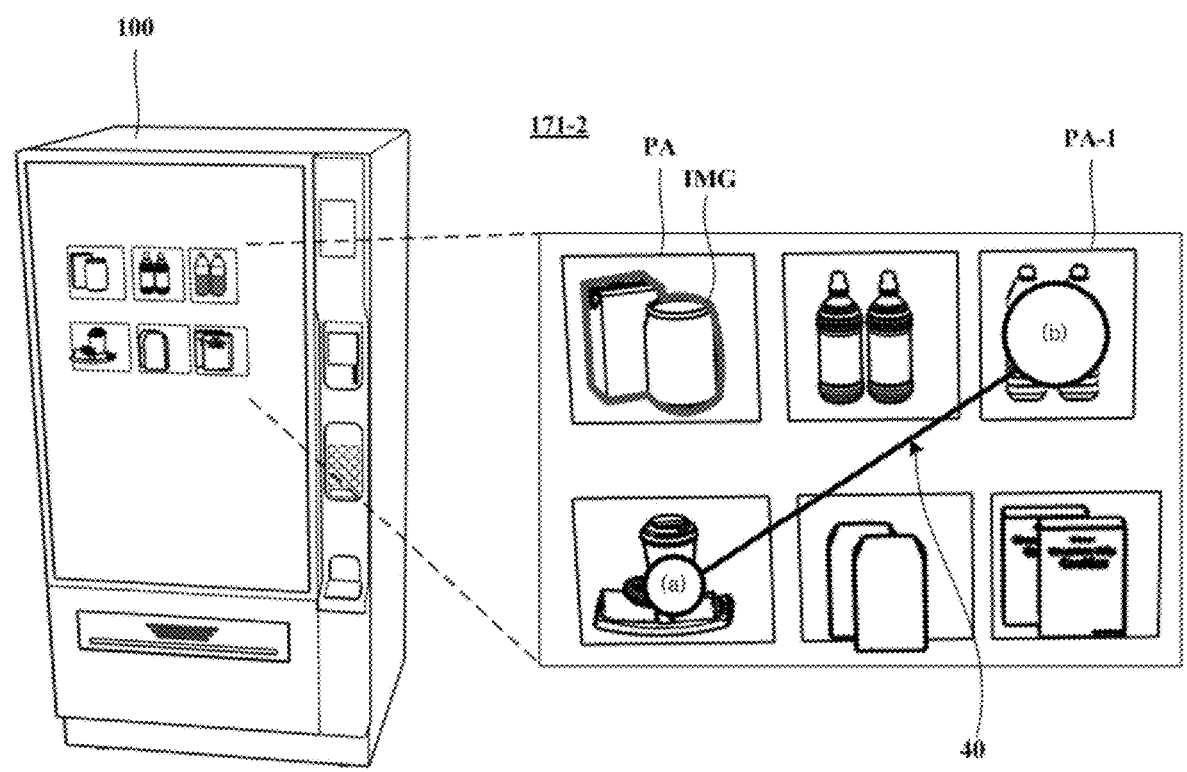
FIG. 6 is an exemplary diagram illustrating a method of setting a region of interest based on gaze information according to an embodiment of the present disclosure.

FIG. 6 is an exemplary diagram illustrating a method of setting a region of interest based on the gaze information 40 according to an embodiment of the present disclosure.

Referring to FIG. 6, the content providing device 100 may determine a region of interest based on a time of interest included in the gaze information 40 representing an item that the user 1 has gazed at from among one or more items displayed on the item display 171-2 of the content providing device 100.

In other words, the region of interest is a region that the user 1 gazes at for a predetermined time or longer and may be determined based on the time of interest in the embodiment.

Specifically, FIG. 6 shows the gaze information 40 from the viewpoint of the user 1 rather than the viewpoint of the image sensor attached to the content providing device 100 for convenience of description. That is, the gaze information 40 shown in FIG. 6 may be regarded as the gaze of the user.

In this case, (a) and (b) included in the gaze information 40 may be regions of interest determined based on times of interest. The sizes of (a) and (b) are proportional to the times of interest, and the content providing device 100 may determine the region (b) for which a longer time of interest is set as a region of interest as described above in the embodiment.

Further, the region of interest determined here may be located on at least one item image IMG displayed on the item display 171-2 of the content providing device 100.

In addition, if at least one user 1 is present, the content providing device 100 may generate a number of pieces of gaze information 40 proportional to the number of users 1.

The content providing device 100 in the embodiment may derive a pixel area PA having a high rate of matching with the determined region of interest (S109).

Specifically, the content providing device 100 in the embodiment may derive a first pixel area PA-1 having a highest matching rate from among a plurality of pixel areas PA included in the item display 171-2 by comparing match rates between the determined region of interest and the pixel areas PA.

Here, the pixel area PA means a predetermined area where each item is located in the item display 171-2 on which a plurality of items is displayed or the item image IMG is displayed.

To this end, the content providing device 100 in the embodiment may preset at least one pixel area PA by individually matching an item and an item image IMG for each pixel area PA.

The item image IMG means a representative image of an item that can be sold to a user using the content providing device 100, and at least one item image may be displayed on the item display 171-2.

Accordingly, as many pixel areas PA and item images IMG as the number of items provided by the content providing device 100 may be present.

In addition, the content providing device 100 may preset pixel areas PA using a method of dividing the item display 171-2 at a predetermined ratio (e.g., 9 divisions) and setting each divided area as a pixel area PA, a method of setting a predetermined area adjacent to each item image IMG (e.g., a rectangular area including each item image IMG) as a pixel area PA, or the like in the embodiment.

Although the content providing device 100 presets pixel areas PA using the latter method in the embodiment of the present disclosure, the method of presetting pixel areas PA is not limited thereto and various embodiments may be present.

The content providing device 100 in the embodiment may compare matching rates of the plurality of pixel areas PA included in the item display 171-2 and the determined region of interest of the user 1 and derive the first pixel area PA-1 having the highest matching rate.

Referring back to FIG. 6, the content providing device 100 in the embodiment may preset as many pixel areas PA as the number (e.g., 9 in FIG. 6) of items on sale. In this case, each pixel area PA may include one item and one item image IMG.

In addition, the content providing device 100 in the embodiment may derive a first pixel area (e.g., PA-1 in FIG. 6) having the highest rate of matching with (b), which is the region of interest of the user.

Here, the content providing device 100 in the embodiment may derive the first pixel area PA-1 having the highest rate (e.g., matching rate of 80% or more) of matching with the region of interest from among the plurality of pixel areas PA.

Next, the content providing device 100 in the embodiment may detect an item matching the derived pixel area PA (S111).

To this end, the content providing device 100 in the embodiment may detect an item matching each pixel area PA by determining that it is an item that the user 1 is gazing at.

That is, the content providing device 100 in the embodiment may derive the first pixel area PA-1 having the highest rate of matching with the region of interest among the plurality of pixel areas PA and detect an image matching the derived first pixel area PA-1.

Here, the detected item may include product information corresponding to an advertisement and additional information with respect to the item. To this end, the content providing device 100 in the embodiment may individually match product information included in each item sold to the user 1 using the content providing device 100 with each item and store the same in the product information database 111 in advance.

Even when a plurality of item pages is present due to limitation on the number of item images IMG that can be displayed at one time on the item display 171-2, an item matching a predetermined pixel area PA in a corresponding item page may be detected.

To this end, the content providing device 100 in the embodiment may detect an item page change input of the user 1 using the input system 150.

In addition, the content providing device 100 in the embodiment may change an item and an item image IMG matching a predetermined pixel area PA in a corresponding item page according to the item page change input of the user 1.

Accordingly, the content providing device 100 may detect an item matching a pixel area PA derived on the item page changed according to the input of the user 1.

Referring back to FIG. 6, when a first item page is changed to a second item page by detecting input of the user 1, for example, the content providing device 100 may change a first item matching the first pixel area PA-1 to a second item.

Here, since the item image IMG displayed for each pixel area PA of the plurality of item pages is changed and accordingly a detected item is also different, the content providing device 100 may include item page information in a preset pixel area PA.

That is, even if the content providing device 100 derives the same pixel area PA as the user 1 gazes at the same area of the item display 171-2, different items may be detected according to item page information included in the pixel area PA.

Then, the content providing device 100 in the embodiment may output content with respect to the detected item (S113).

Specifically, the content providing device 100 in the embodiment may output product information on the detected item based on the product information database 111 to the content display 171-1 as content.

In addition, when product information on the detected item is not present in the product information database 111, the content providing device 100 in the embodiment may obtain content including advertisements and additional information with respect to the detected item through an OTT media service using the communication processor 130 and output the content to the content display 171-1.

According to an embodiment, the content providing device 100 may detect an item matching the aforementioned pixel area from the product information database 111, obtain product information on the detected item through the Internet based on the disclosed OTT media service and provide the product information.

In summary, the content providing device 100 may determine and detect an item that the user 1 gazes at among a plurality of items displayed on the item display 171-2 and display an advertisement and additional information with respect to the item on the content display 171-1 to provide content to the user 1.

In addition, the content providing device 100 may provide content to the user 1 by detecting an item selection input of the user 1 using the input system 150 as well as gaze information of the user 1.

To this end, the content providing device 100 may detect an item selection input of the user 1 for selecting a pixel area PA including at least one item among a plurality of items displayed on the item display 171-2.

According to the input, the content providing device 100 may derive the pixel area PA selected by the user 1, detect an item matching the derived pixel area PA, and output product information content with respect to the detected item.

In addition, the content providing device 100 in the embodiment may manage (reproduce, change, stop and end in the embodiment) content displayed on the content display 171-1 based on the gaze information 40 of the user 1 generated in step S105.

For example, 1) when the gaze information 40 of the user 1 is not collected on the item display 171-2, the content providing device 100 in the embodiment may maintain a state in which content being reproduced is displayed on the content display 171-1 upon determining that the user 1 continuously gazes at the content being reproduced on the content display 171-1.

For example, 2) when the gaze information 40 of the user 1 is collected on the item display 171-2 and a region of interest included in the gaze information 40 is changed, the content providing device 100 in the embodiment may stop content being reproduced, return to step S109, change the content to content with respect to an item that the user 1 is newly gazing at, and reproduce the content.

For example, 3) when the gaze information 40 of the user 1 is not collected on the item display 171-2 and the face recognition image 10 obtained using the image sensor 161 is not present, the content providing device 100 in the embodiment may end content being reproduced upon determining that the user 1 does not want to purchase an item and thus stop using the content providing device 100.

In the case of 3) described above, general advertisements may be displayed on the content display 171-1 targeting general passers-by rather than the user 1, thereby increasing the efficiency of use of the content providing device 100.

Meanwhile, a content providing device 100 according to another embodiment may provide customized content based on gaze recognition to each of a plurality of users even when the users use the content providing device 100.

In another embodiment which will be described below, only differences from the above-described embodiment are described, and the method of the above-described embodiment is applied to content not described.

Figure 7:
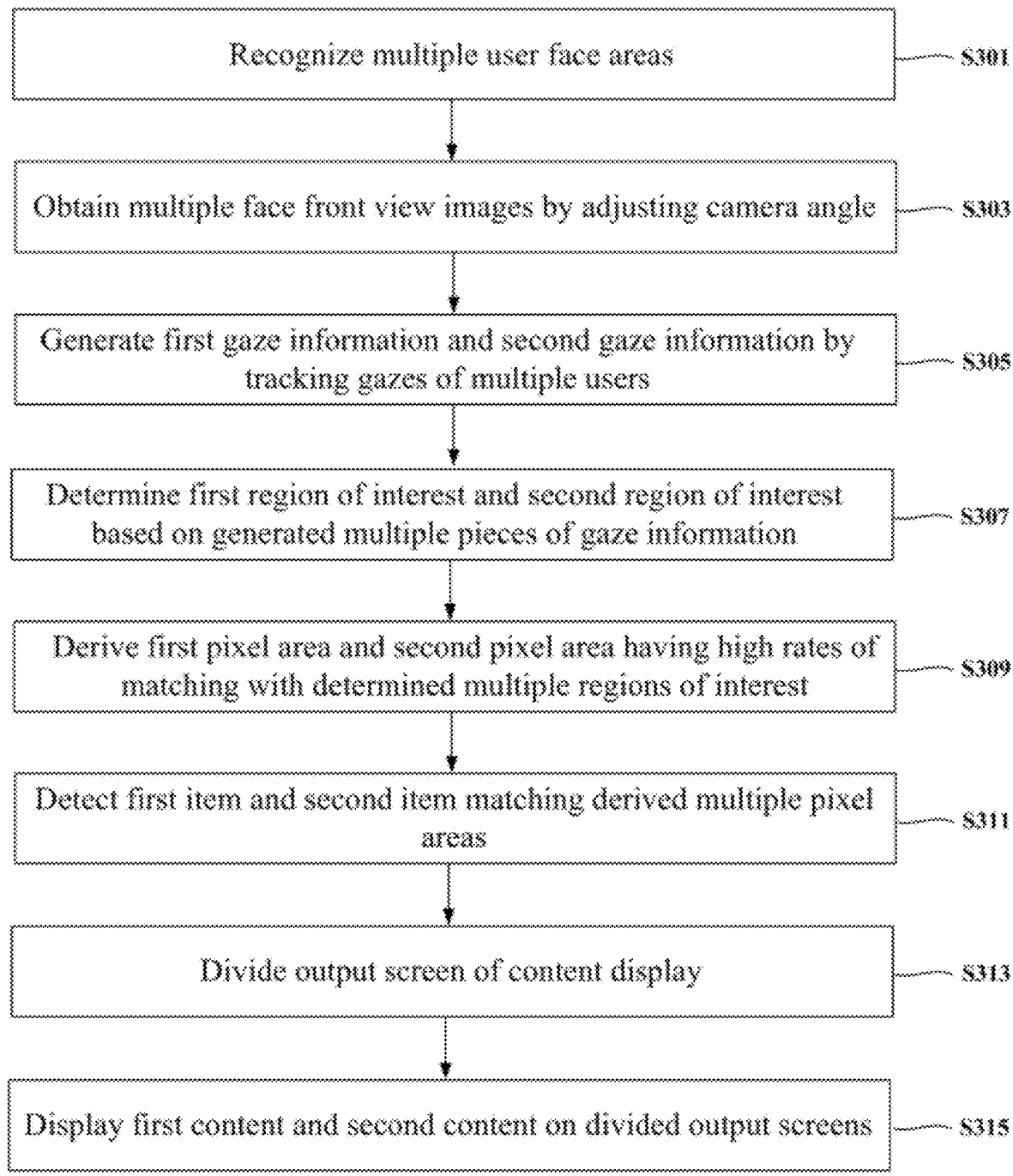
FIG. 7 is a flowchart illustrating a method of providing customized content based on gaze recognition according to another embodiment of the present disclosure.

FIG. 7 is a flowchart illustrating a method of providing customized content based on gaze recognition according to another embodiment of the present disclosure.

Referring to FIG. 7, the content providing device 100 in another embodiment may recognize a plurality of user face areas FA based on the face recognition image 10 (S301).

Specifically, when a plurality of recognized face areas FA of users 1 is included in the face recognition image 10 and all of the recognized face areas FA have a predetermined size (e.g., 3 cm$^2$) or more, the content providing device 100 in another embodiment may recognize the plurality of user face areas FA.

Although a case in which two users 1 are present is described for convenience of description, the number of users is not limited to two and various embodiments in which fewer or more users 1 are present may be possible.

For example, when there are two users 1 who want to use the content providing device 100 and both of two recognized face areas FA have a predetermined size or more, the content providing device 100 may determine that there is a plurality of users who intend to use the content providing device 100.

Next, the content providing device 100 in another embodiment may adjust the camera angle according to the recognized face areas FA (S303).

Specifically, since there is a plurality of recognized face areas FA, the content providing device 100 in another embodiment may derive an angle at which all of the plurality of face areas FA are normally recognized and adjust the camera angle.

For example, the content providing device 100 may adjust the camera angle such that the center point of the camera is positioned at the center of the two recognized face areas FA. Further, the content providing device 100 in another embodiment may generate first gaze information and second gaze information by tracking gazes of the plurality of users (S305).

Here, the content providing device 100 in another embodiment may generate the first gaze information obtained by tracking the gaze of a first user and the second gaze information obtained by tracking the gaze of a second user.

Further, the content providing device 100 in another embodiment may determine a first region of interest and a second region of interest based on the generated plurality of pieces of gaze information (S307).

Here, the content providing device 100 in another embodiment may determine the first region of interest from the generated first gaze information and determine the second region of interest from the second gaze information.

That is, the content providing device 100 in another embodiment may generate a number of pieces of gaze information and a number of regions of interest proportional to the number of users.

Further, the content providing device 100 in another embodiment may derive a first pixel area and a second pixel area having a high rate of matching with the determined plurality of regions of interest (S309).

Here, when the derived first pixel area and second pixel area are the same, the content providing device 100 in another embodiment may determine that the plurality of users gazes at the same item and display only one content on the content display 171-1 through the same manner as in S111 and S113.

In other words, when the derived first pixel area and second pixel area are different, the content providing device 100 in another embodiment may determine that the plurality of users gazes at different items and perform step S311 to display a plurality of pieces of content on the content display 171-1.

Further, the content providing device 100 in another embodiment may detect a first item and a second item matching the derived plurality of pixel areas (S311).

Subsequently, the content providing device 100 in another embodiment may divide an output screen on the content display 171-1 (S313).

Here, the output screen of the content display 171-1 may be divided into a number corresponding to the number of recognized users.

Further, the content providing device 100 in another embodiment may display first content and second content on the divided output screens (S315).

Specifically, the content providing device 100 in another embodiment may display the first content and the second content on divided output screens of the content display 171-1 located close to each user.

Figure 8:
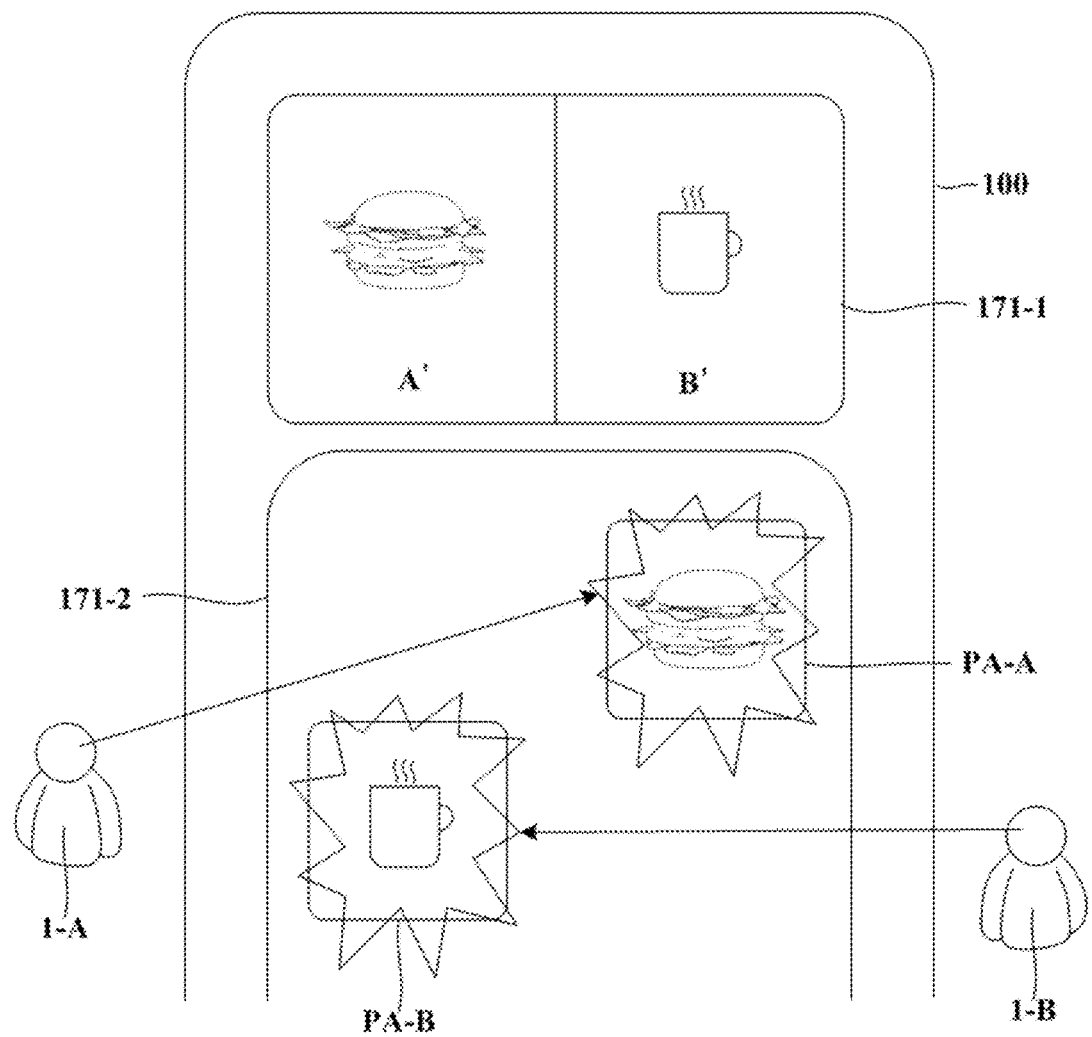
FIG. 8 is an exemplary diagram showing output of a plurality of pieces of customized content based on gaze recognition according to another embodiment of the present disclosure.

FIG. 8 is an exemplary diagram showing output of a plurality of pieces of customized content based on gaze recognition according to another embodiment of the present disclosure.

Referring to FIG. 8, the content providing device 100 in another embodiment may device a first pixel area PA-A and a second pixel area PA-B included in the item display 171-2 by tracking gazes of a first user 1-A and a second user 1-B.

Here, the content providing device 100 in another embodiment may display content on a divided output screen close to each user based on the positions of the first user 1-A and the second user 1-B regardless of the positions of the first pixel area PA-A and the second pixel area PA-B.

For example, the content providing device 100 may display content with respect to an item corresponding to the first pixel area PA-A that the first user 1-A is gazing at on a divided output screen A' close to the first user 1-A and display content with respect to an item corresponding to the second pixel area PA-B that the second user 1-B is gazing at on a divided output screen B' close to the second user 1-B.

Further, upon detecting that the second gaze information of the second user is fixed to the divided output screen A' for a predetermined period of time or longer, the content providing device 100 may stop display of the second content on the divided output screen B' and output the first content. In this case, the content providing device 100 may output the first content by controlling the reproduction time of the first content such that it corresponds to the current time at which the first content is displayed on the divided output screen A'. Further, upon detecting that the second gaze information of the second user is changed to correspond to the divided output screen B' controlled to output the first content, the content providing device 100 may continue output of the first content. In addition, if a predetermined time elapses from when the second gaze information of the second user is not changed to the divided output screen B' controlled to output the first content and is changed to the first content on the divided output screen A', the content providing device 100 may display the first content on the entire display area by combining the divided output screen A' and the divided output screen B'. Here, the content providing device 100 may control the output direction of the first content such that it matches the first gaze information of the first user. In addition, the content providing device 100 may control the first content of the divided output screen A' such that it gradually increases to be displayed on the divided output screen B' in order to smoothly combine the divided output screens. Further, the content providing device 100 may control an interaction screen through which the second user can apply additional input for information request/purchase for the first content to be displayed in a predetermined area within the divided output screen B'. Further, upon detecting an input of the second user through the interaction screen, the content providing device 100 may divide the output screen into the output screen B' and the output screen A' again and then control customized content according to the input of the second user to be displayed on the divided output screen B'.

Meanwhile, the content providing device 100 may provide a lock mode in which the first user fixes the size of the divided output screen A' such that the first user does not feel uncomfortable when the second user changes divided output screens. When the first user sets the lock mode for the divided output screen A', customized content according to the first gaze information of the first user can be continuously provided in a state in which the current size and position are fixed regardless of detection of an additional user or the position or gaze information of the second user.

Further, the content providing device 100 in another embodiment may designate divided output screens corresponding to the positions of the user face areas FA recognized in step S301.

As described above, according to the device and method for providing customized content based on gaze recognition according to an embodiment of the present disclosure, it is possible to reduce a time required for initial settings suited to a user each time the user is changed by automatically adjusting the viewing angle of the camera attached to the device in real time according to physical characteristics of the user.

In addition, according to the device and method for providing customized content based on gaze recognition according to an embodiment of the present disclosure, it is possible to output content with respect to a product a user is gazing at, thereby intuitively ascertaining a product of interest of the user and improving user satisfaction according to content exposure.

Furthermore, according to the device and method for providing customized content based on gaze recognition according to an embodiment of the present disclosure, it is possible to effectively uses the content output screen by dividing the content output screen according to the number of users, thereby increasing delivery of advertisements and information to each user.

The embodiments according to the present disclosure described above may be implemented in the form of program instructions that can be executed through various computer components and recorded in a computer-readable recording medium. The computer-readable recording medium may include program instructions, data files, data structures, and the like alone or in combination. The program instructions recorded in the computer-readable recording medium may be specially designed and configured for the present disclosure, or may be known and used by those skilled in the art of computer software. Examples of the computer-readable recording medium include a hard disk, magnetic media such as a floppy disc and a magnetic tape, optical recording media such as a CD-ROM and a DVD, magneto-optical media such as a floptical disk, and hardware devices specially configured to store and execute program instructions, such as a ROM, a RAM, and flash memory. Examples of program instructions include not only machine language code such as those generated by a compiler, but also high-level language code that can be executed by a computer using an interpreter or the like. A hardware device may be converted into one or more software modules to perform processing according to the present disclosure, and vice versa.

What is claimed is:

1. A method of providing content customized based on gaze recognition executed by at least one processor of a content providing device, the method comprising:

obtaining a face recognition image of at least one user using an image sensor;

obtaining an image of a front view of a face of the user by controlling the image sensor based on the obtained face recognition image;

generating gaze information including a gaze direction and time of gaze fixation of the user based on the obtained image of the front view of the face of the user;

determining an item area of a first display area corresponding to the generated gaze information as a region of interest by comparing the time of the gaze fixation of the user with a preset time and considering the gaze direction;

detecting an item matching the determined region of interest; and outputting product information content associated with the detected item to a second display area, wherein the first display area is an area for displaying at least one item, and the second display area is the area for displaying at least one product information content corresponding to the items, wherein the outputting product information content includes, when the user's gaze information is changed, updating the region of interest into an item area corresponding to the changed gaze information, displaying a product information content corresponding to the updated region of interest on the second display area, obtaining a first product information content of a first item that corresponds to a gaze information of one user in the first display area, obtaining a second product information content of a second item that corresponds to a gaze information of another user in the first display area, and displaying the first and second product information on the second display area.

2. The method of claim 1, wherein the obtaining of the image of the front view of the face of the user by controlling the image sensor based on the obtained face recognition image comprises:

providing the face recognition image as input data of a pre-trained deep learning neural network;

obtaining information on a face pose of the user as output data of the pre-trained deep learning neural network; and controlling the image sensor based on the obtained information on the face pose.

3. The method of claim 1, wherein the determining an item area of a first display area corresponding to the generated gaze information as a region of interest comprises determining the item area of the first display area corresponding to the gaze direction of the user as the region of interest when the time of the gaze fixation of the user is longer than or equal to the preset time.

4. The method of claim 1, wherein the detecting of the item matching the determined region of interest comprises:

obtaining a user's input for selecting an item page output based on the first display area corresponding to the generated gaze information; and detecting the item matching the region of interest in the selected item page.

5. The method of claim 1, wherein the detecting of the item matching the determined region of interest comprises:

detecting one or more pixels in the first display area matching the region of interest; and detecting a pre-stored item corresponding to the detected one or more pixels.

6. The method of claim 1, further comprising:

obtaining a user's input for selecting one or more pixels within the first display area corresponding to the generated gaze information;

detecting a pre-stored item corresponding to the selected one or more pixels; and outputting the product information content associated with the detected item to the second display area.

7. The method of claim 1, wherein:

the at least one user includes a first user and a second user, and the generating of the gaze information including the gaze direction and the time of the gaze fixation of the user based on the obtained image of the front view of the face of the user comprises:

detecting a first face area of the first user and a second face area of the second user from the obtained face recognition image; and controlling an angle of a camera including the image sensor to cover the detected first and second face areas of the first and second users.

8. The method of claim 7, wherein the generating of the gaze information including the gaze direction and the time of the gaze fixation of the user based on the obtained image of the front view of the face of the user comprises generating first gaze information of the first user based on the first face area of the first user and generating second gaze information of the second user based on the second face area of the second user.

9. The method of claim 8, wherein the determining an item area of a first display area corresponding to the generated gaze information as a region of interest comprises:

determining a first area of one or more first pixels corresponding to the generated first gaze information; and determining a second area of one or more second pixels corresponding to the generated second gaze information.

10. The method of claim 9, wherein the detecting of the item matching the determined region of interest comprises:

detecting a first item matching the determined first area of the one or more first pixels corresponding to the generated first gaze information; and detecting a second item matching the determined second area of the one or more second pixels corresponding to the generated second gaze information.

11. The method of claim 10, wherein the outputting of the product information content associated with the detected item comprises:

dividing the second display area into a first output screen for the first user and a second output screen for the second user; and displaying first product information content corresponding to the detected first item on the first output screen and displaying second product information content corresponding to the second item on the second output screen.

12. The method of claim 11, wherein the dividing of the second display area into the first output screen for the first user and the second output screen for the second user comprises:

determining a first position of the first user and a second position of the second user based on the second display area;

determining a first area of the second display area corresponding to the determined first position of the first user as the first output screen; and determining a second area of the second display area corresponding to the determined second position of the second user as the second output screen.

13. A device for providing content customized based on gaze recognition, the device comprising:

at least one image sensor configured to obtain a face recognition image of at least one user;

at least one display area configured to display product information content based on the obtained face recognition image, wherein the display area includes a first display area and a second display area, the first display area is an area for displaying at least one item, and the second display area is the area for displaying at least one product information content corresponding to the items; and at least one processor configured to:

obtain an image of a front view of a face of the user by controlling the image sensor based on the face recognition image, generate gaze information including a gaze direction and time of gaze fixation of the user based on the obtained image of the front view of the face of the user, determine an item area of a first display area corresponding to the generated gaze information as a region of interest by comparing the time of the gaze fixation of the user with a preset time and considering the gaze direction, detect an item matching the determined region of interest, and output the product information content associated with the detected item to a second display area, wherein outputting the product information content includes, when the user's gaze information is changed, update the region of interest into an item area corresponding to the changed gaze information, display a product information content corresponding to the updated region of interest on the second display area, obtain a first product information content of a first item that corresponds to a gaze information of one user in the first display area, obtain a second product information content of a second item that corresponds to a gaze information of another user in the first display area, and display the first and second product information on the second display area.

14. The device of claim 13, wherein the processor is configured to:

obtain information on a face pose of the user based on deep learning based on the face recognition image, and obtain the image of the front view of the face of the user by controlling the image sensor based on the obtained information on the face pose of the user.

15. The device of claim 13, wherein the processor is configured to input the face recognition image as input data of a pre-trained deep learning neural network, obtain information on a face pose of the user as output data of the pre-trained deep learning neural network, and control the image sensor based on the obtained information on the face pose.

16. The device of claim 13, wherein the processor is configured to perform control to detect one or more pixels in the first display area matching the region of interest and to detect a pre-stored item corresponding to the detected one or more pixels.

17. The device of claim 13, wherein the processor is configured to perform control to obtain a user's input for selecting one or more pixels in the first display area corresponding to the generated gaze information, to detect a pre-stored item corresponding to the selected one or more pixels, and to output the product information content associated with the detected item to the second display area.

* * * * *